US006654148B2

United States Patent
Nishii

(10) Patent No.: US 6,654,148 B2
(45) Date of Patent: *Nov. 25, 2003

(54) COMMUNICATION APPARATUS FOR DETECTING A SIGNAL FROM A COMMUNICATION NETWORK

(75) Inventor: Teruyuki Nishii, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,257

(22) Filed: Jun. 26, 1998

(65) Prior Publication Data

US 2002/0105680 A1 Aug. 8, 2002

(30) Foreign Application Priority Data

Jul. 8, 1997 (JP) .............................. 9-182471

(51) Int. Cl.⁷ ................................. H04N 1/00
(52) U.S. Cl. ...................... 358/434; 358/407; 358/438
(58) Field of Search ................... 358/407, 409, 358/402, 405, 434, 411, 412, 426, 435, 404, 438; 379/100.1, 351; 340/526; 370/335

(56) References Cited

U.S. PATENT DOCUMENTS

| 4,061,880 A | * 12/1977 | Collins et al. ................ 179/15 |
| 4,897,831 A | 1/1990 | Negi et al. .................... 370/29 |
| 5,267,301 A | 11/1993 | Nishii ......................... 379/93 |
| 5,291,484 A | * 3/1994 | Tomita et al. .............. 370/68.1 |
| 5,367,464 A | * 11/1994 | Abumehdi et al. ..... 364/464.02 |
| 5,402,475 A | * 3/1995 | Lesner, Jr. et al. ............ 379/95 |
| 5,416,785 A | 5/1995 | Nishii ......................... 371/32 |
| 5,448,378 A | * 9/1995 | Matsumoto .................. 358/468 |
| 5,465,162 A | 11/1995 | Nishii et al. ................. 358/442 |
| 5,479,500 A | 12/1995 | Matsuzaki et al. .......... 379/355 |
| 5,481,696 A | * 1/1996 | Lomp et al. ................. 395/500 |
| 5,680,449 A | 10/1997 | Terajima et al. ............. 379/355 |
| 5,805,581 A | * 9/1998 | Uchida et al. ................. 370/35 |
| 5,854,830 A | * 12/1998 | Kenmochi ............. 379/100.15 |
| 5,937,097 A | * 8/1999 | Lennon ....................... 382/236 |
| 5,946,348 A | * 8/1999 | Mizutani et al. ............ 375/222 |
| 5,974,123 A | * 10/1999 | Nakayama et al. ..... 379/100.16 |
| 6,040,921 A | * 3/2000 | Hayashi et al. ............. 358/434 |

\* cited by examiner

Primary Examiner—Thomas D. Lee
(74) Attorney, Agent, or Firm—Fitzpatrick, Cella, Harper & Scinto

(57) ABSTRACT

When detecting a signal from a communication network, signal detection is performed corresponding to the characteristics of a communication apparatus of a communication partner and the characteristics of the communication network, and to prevent erroneous detection of a signal due to a voice or the like. More specifically, using a tone detection function of a modem of a communication unit, a control unit determines if a signal of at least one period has been detected in accordance with detection parameters, i.e., a frequency, a level, and an on-time and an off-time, which correspond to a tone signal to be detected and which can deal with variations in the characteristics of the signal. When a signal of at least one period has been detected, changed detection parameters are calculated and set by adding margins to the frequency, the level, and the on-time and the off-time of the detected signal, and a signal of at least one period is again detected using the newly set detection parameters.

19 Claims, 6 Drawing Sheets

COMMUNICATION APPARATUS FOR DETECTING A SIGNAL FROM A COMMUNICATION NETWORK

BACKGROUND OF THE INVENTION

1. Field of the Invention

The present invention relates to a communication apparatus for detecting a signal from a communication network.

2. Description of the Related Art

Facsimile apparatuses for detecting various kinds of tone signals and control signals from a network are present as conventional apparatuses of this kind. Some conventional facsimile apparatuses have an automatic calling function, an automatic call-receiving function, a function of connecting a call to a message-receiving telephone set, and the like, and perform desired processing by identifying various kinds of tone signals transmitted from a switchboard, a voice or various kinds of control signals transmitted from an operator of a communication partner or a communication apparatus of the communication partner, respectively, and a voice response message transmitted from a message-receiving telephone set or according to a voice response function provided in the facsimile apparatus, and the like. In such conventional apparatuses having known signal formats, information (parameters) for detecting a signal, such as a frequency, an on-time and an off-time, and the like, is set in consideration of variations in the characteristics of a communication network, and a signal having parameters within a detection range is monitored.

In the conventional facsimile apparatuses, since a detection frequency, and an on-time and an off-time of a signal are set in consideration of variations in the characteristics of a communication partner's apparatus and the characteristics of a communication network, a large margin is set for an actual signal. Accordingly, a voice transmitted from an operator of a communication partner, or a communication parnter's apparatus, a voice response message transmitted from a message-receiving telephone set connected to the facsimile apparatus, or according to a voice response function of the facsimile apparatus, or the like is erroneously detected as a tone signal or a control signal to be detected, resulting in a misoperation of the apparatus.

SUMMARY OF THE INVENTION

The present invention has been made in consideration of the above-described problems.

It is an object of the present invention to provide an improved communication apparatus.

It is another object of the present invention to provide a communication apparatus which can perform signal detection corresponding to variations in the characteristics of a communication apparatus of a communication partner or in the characteristics of a communication network when detecting a signal from the communication network.

According to one aspect, the present invention which achieves these objectives relates to a communication apparatus for detecting a signal from a communication network. The apparatus includes detection means for detecting a signal of one period in accordance with preset detection parameters, and changing means for changing the detection parameters based on the signal detected by the detection means, the detection means then detecting a signal of one period in accordance with the changed detection parameters.

According to another aspect, the present invention which achieves these objectives relates to a communication method for detecting a signal from a communication network. The method includes the steps of detecting a signal of one period in accordance with preset detection parameters, changing the preset detection parameters based on the detected signal, and detecting a signal of one period in accordance with the changed detection parameters.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described in detail with reference to the drawings.

In the embodiment, a description will be provided illustrating a facsimile apparatus as a communication apparatus.

Figure 1:
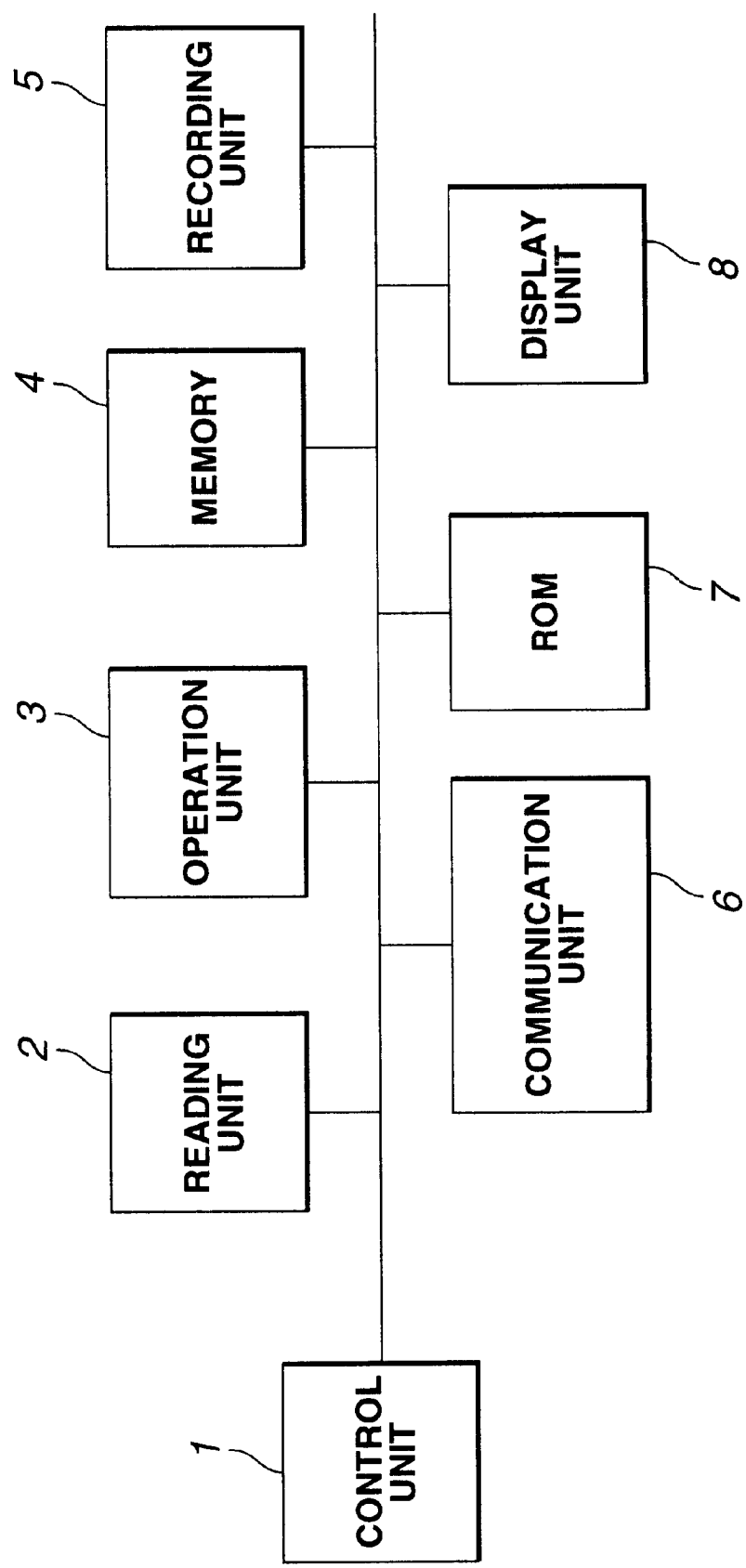
FIG. 1 is a block diagram illustrating the configuration of a facsimile apparatus according to an embodiment of the present invention.

FIG. 1 is a block diagram illustrating the configuration of a facsimile apparatus according to the embodiment.

In FIG. 1, a control unit 1 includes a microprocessor and the like, and controls the entire apparatus in accordance with programs stored in a ROM (read-only memory) 7.

A memory 4 is used for storing data of various kinds of constants input from various kinds of keys of an operation unit 3 by the operator, variables used when the control unit 1 performs various kinds of processing, read and recorded image data, and the like. Data is read from or written in the memory 4 whenever necessary.

A display unit 9 displays guidance when performing an operation, such as registration or the like, and the state of the apparatus, such as various kinds of warnings, time and the like.

A reading unit 2 performs a reading operation, and includes a scanner for performing scanning in units of a line, and the like. A recording unit 5 performs a printing operation of an image signal, and various kinds of reports, such as the constants of the apparatus, and the like.

A communication unit 6 includes a modem, an NCU (network control unit) and the like, and performs data communication or conversation in a state of being connected to a communication network and an attached telephone set.

Figure 2:
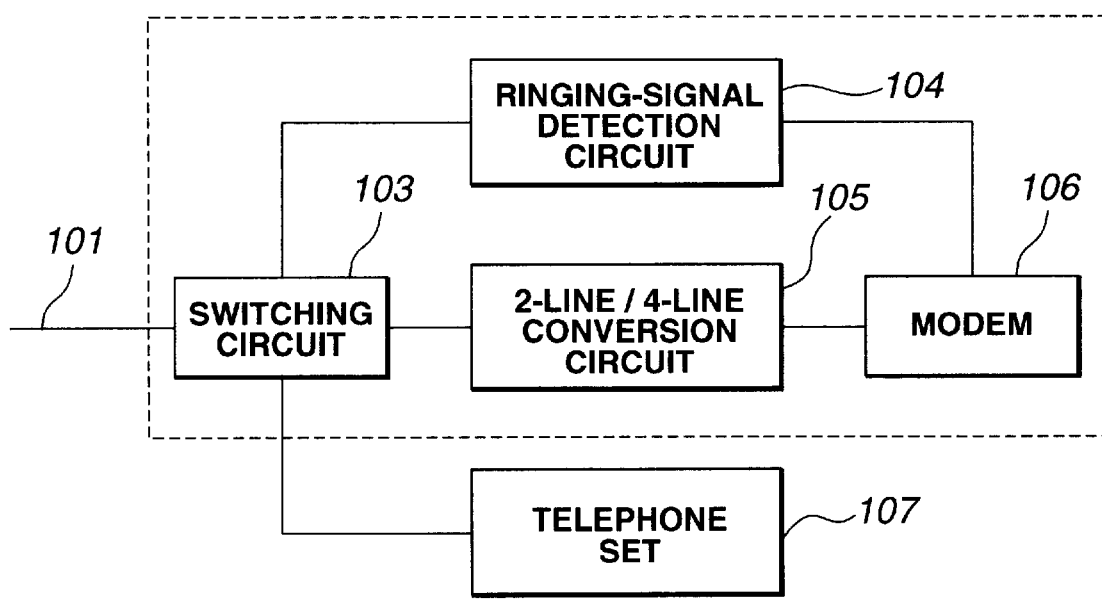
FIG. 2 is a diagram illustrating the configuration of a communication unit shown in FIG. 1.

FIG. 2 is a block diagram illustrating the configuration of the communication unit 6.

In FIG. 2, there are shown a communication network 101, and a switching circuit 103 for switching a communication line. The switching circuit 103 controls connection to the communication network 101 by performing switching between a telephone set 107 and a modem 106.

The modem 106 is connected to the switching circuit 103 via a 2-line/4-line conversion circuit 105, and performs modulation of a transmitted signal, demodulation of a received signal, and detection of an effective ringing signal by monitoring the output of a ringing-signal detection circuit 104.

Figure 3:
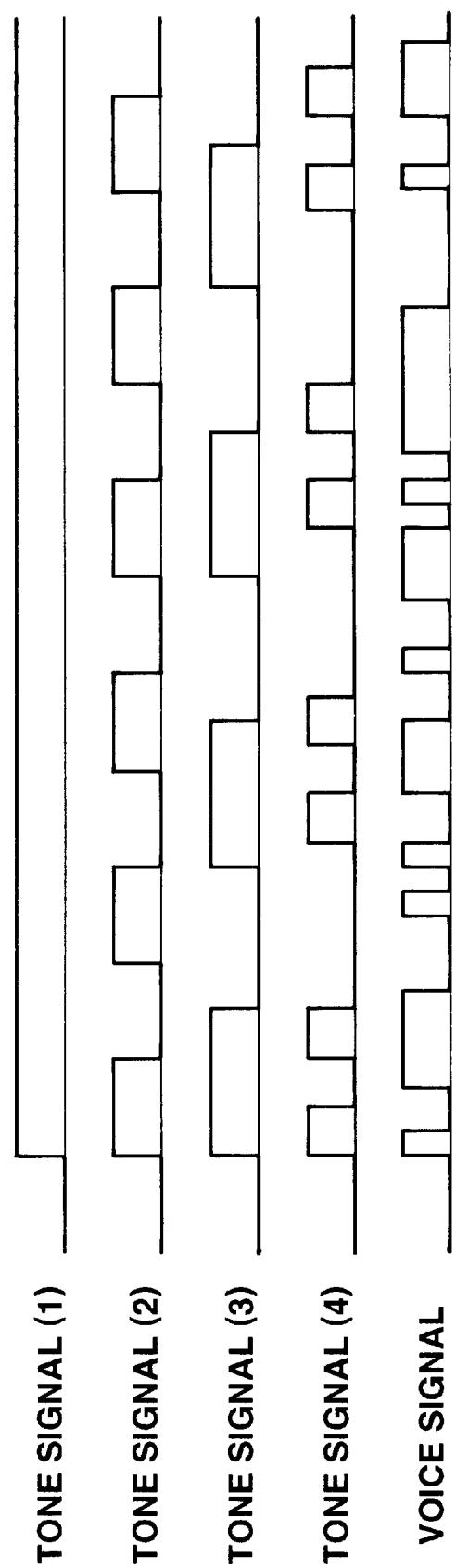
FIG. 3 is a diagram illustrating tone signals detected during an automatic call (dialing)

FIG. 3 is a diagram illustrating various kinds of signals to be monitored when performing an automatic call according to an automatic dialing function.

When performing an automatic call, it is necessary to discriminate among various kinds of signals transmitted from a switchboard after a dial call, a voice signal provided in conversation, a facsimile-communication control signal, and the like. Since signals transmitted from the switchboard, such as a DT (dial tone), a SDT (second dial tone), a BT (busy tone) and the like, are generally tone signals (chords, inclusive of an AM type), means (a configuration) for detecting a tone signal is required when performing an automatic call. Since a transmission-control-procedure signal (DIS or the like) is transmitted when the communication partner is a facsimile apparatus, means for detecting such a signal (using a modem) is also required. When the communication partner is a person, it is necessary to prevent an erroneous operation caused by misrecognizing a voice as such a signal. In general, the energy of a voice signal is distributed within a voice zone which includes the frequency components of the above-described significant tone signal. The period of a voice signal is irregular. Hence, in this embodiment, instead of actively monitoring a voice, a detected signal which is different from the above-described signals is assumed to represent a voice.

Figure 4:
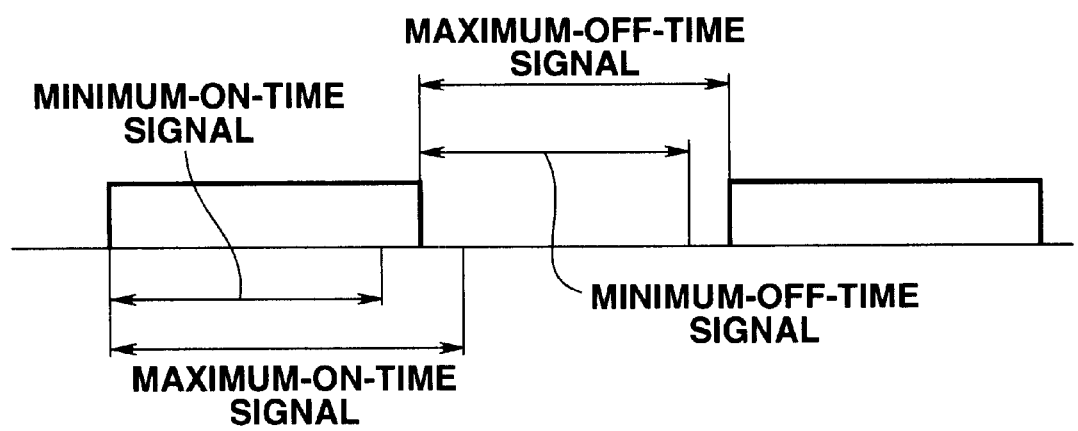
FIG. 4 is a diagram illustrating tone-signal detection parameters and an outline of detection.

FIG. 4 is a diagram illustrating parameters of a tone signal and an outline of detection.

In FIG. 4, maximum and minimum times are determined for both an on-time and an off-time of a signal. It is assumed that a signal of one period has been detected when an on-time and an off-time of a signal have consecutively been detected. Actually, however, as described above, the signal is continuously monitored for a plurality of periods in order to discriminate between other significant signals and a voice signal. The number of continuous detection operations is set to two or three in consideration of the detection time, a period of transmission of a calling-station identifying signal (CED), and the like.

Next, the operation of the embodiment will be described in detail with reference to the flowcharts shown in FIGS. 5 and 6.

Figure 5:
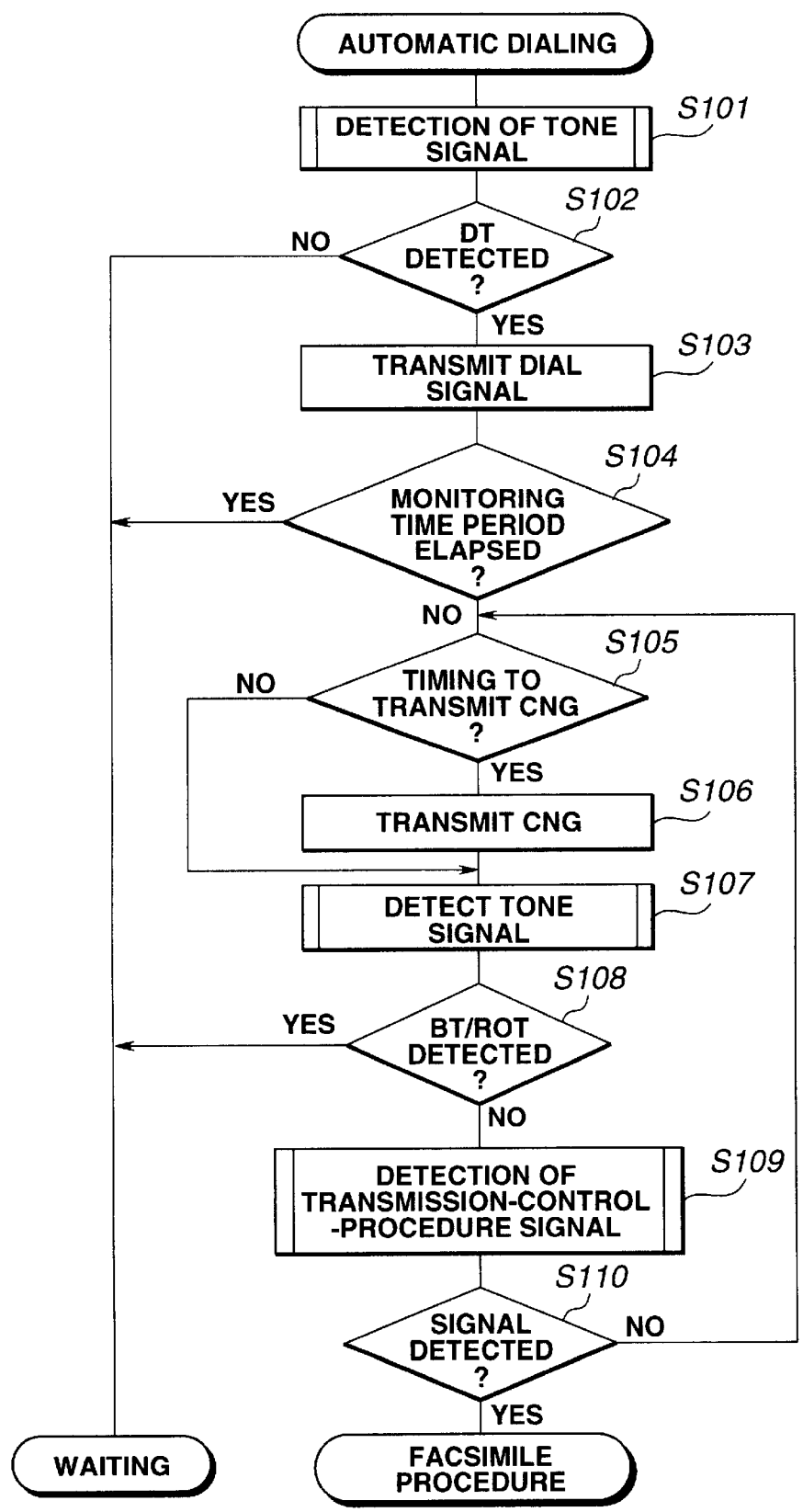
FIG. 5 is a flowchart illustrating the control operation during an automatic call (dialing)

FIG. 5 is a flowchart illustrating the control operation executed by the control unit 1 when performing an automatic call. FIG. 6 is a flowchart illustrating the detail of tone-signal detection processing in the flowchart shown in FIG. 5. A control program for executing the processing shown in these flowcharts is stored in the ROM 7.

In FIG. 5, when an instruction to start an automatic call (automatic dialing) has been performed through a ten-digit keypad, a one-touch key, an abbreviation key or the like on the operation unit 3, then, in step S101, the control unit 1 catches the communication network 101 and causes the switching circuit 103 to connect the communication network 101 to the modem 106 side in response to the instruction of the start, in order to execute detection of a tone signal.

Particularly when the apparatus is set so as not to monitor various kinds of tone signals from the switchboard before dialing, the processing of steps S101 and S102 is not performed, and the processing of transmitting a dial signal (a dial pulse signal or a tone dial signal) to the communication network 101 is performed in step S103.

Figure 6:
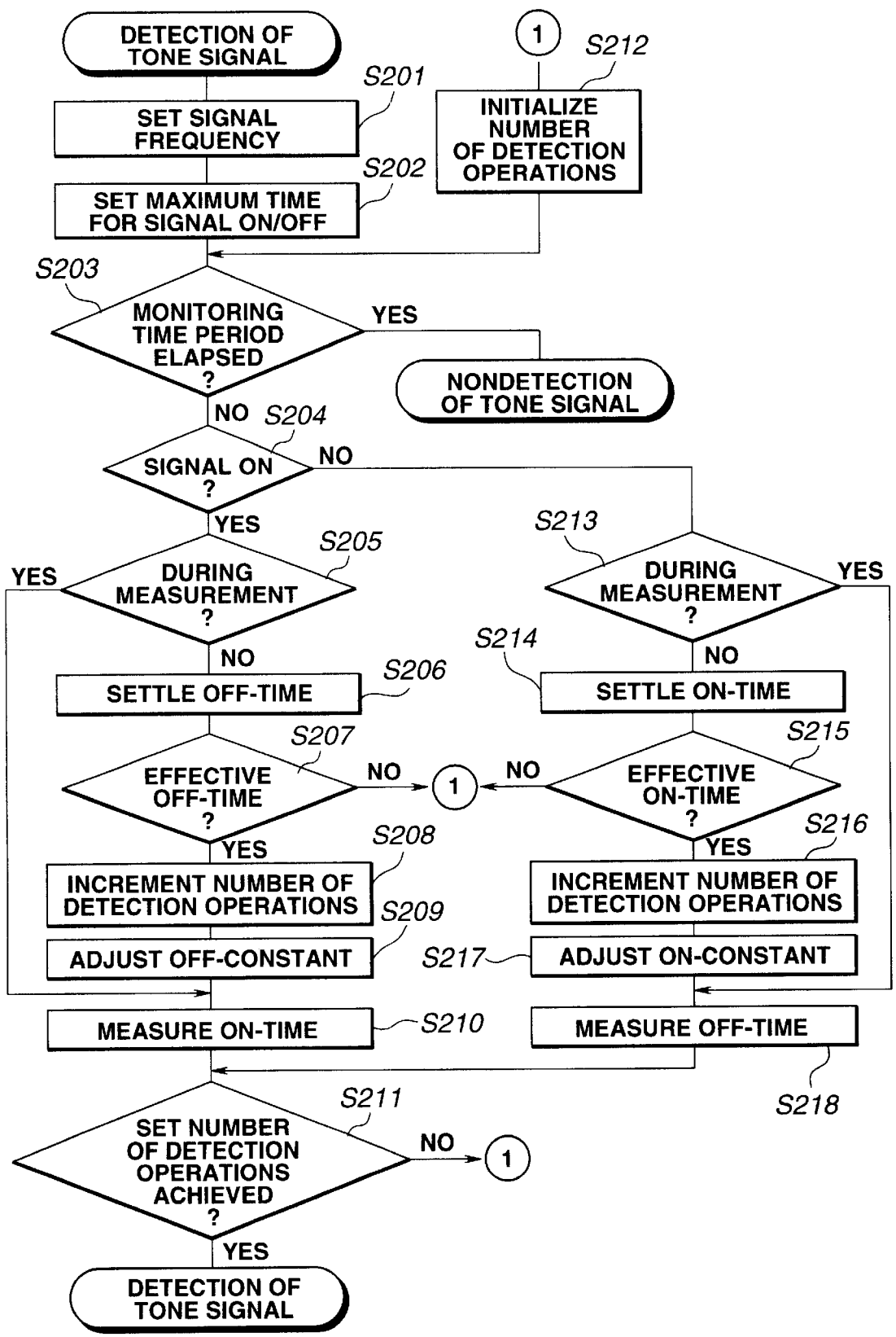
FIG. 6 is a flowchart illustrating the control operation in tone detection processing.

When monitoring a signal (DT/BT) transmitted from the switchboard before transmitting a dial signal, the control unit 1 executes the tone-signal detection processing shown in FIG. 6, and sets detection parameters for a tone signal in the modem 106 (operating in a tone-signal detection mode) in steps S201 and S202. The detection parameters include a center frequency, a bandwidth, a detection level, maximum and minimum on-times and off-times. When simultaneously monitoring a plurality of signals, parameters for respective signals are set.

The control unit 1 also sets a maximum monitoring time period in addition to the above-described parameters, and determines in step S203 if the maximum monitoring time period has elapsed. If the result of the determination in step S203 is affirmative, the tone-signal detection processing is terminated by holding information (state information) indicating that the monitored tone signal could not be detected.

In step S204, the control unit 1 monitors an output from the modem 106 (operating in the tone-signal detection mode). When a signal has been detected in the output of the modem 106, the control unit 1 determines in step S205 if the detected signal is being measured. If the result of the determination in step S205 is affirmative, the process proceeds to step S210, where the measuring processing (the processing of measuring the on-time) is continued.

If the result of the determination in step S205 is negative, the process proceeds to step S206, where the off-time of the signal is settled. Then, in step S207, it is determined if the settled off-time is within the maximum and minimum times of the preset off-time (within a range equal to or larger than the set minimim time and less than the set maximum time, i.e., within an effective off-time). If the result of the determination in step S207 is negative, the process proceeds to step S212, where information relating to signals detected until that time (count values of the number of operations of detecting off-times, and the number of operations of detecting on-times, and the like) is initialized. The process then returns to step S203, and the monitoring processing is continued. If the result of the determination in step S207 is affirmative, the process proceeds to step S208, where the value of a counter for counting the number of operations of detecting off-times is incremented. Then, in step S209, maximum and minimum times are newly calculated by adding a margin to the detected off-time in order to set new detection parameters. Then, in step S210, the control unit 1 starts measurement of the on-time, and the process proceeds to step S211.

When a signal has not been detected from the modem 106 in step S204, the control unit 1 determines in step S213 if a signal is being measured. If the result of the determination in step S213 is negative, the process proceeds to step S218, where measurement of the off-time is started. If the result of the determination in step S213 is affirmative, the process proceeds to step S214, where the on-time is settled.

In step S215, the control unit 1 determines if the settled on-time is within a range equal to or more than the set minimum time and less than the set maximum time (i.e., within an effective on-time). If the result of the determination in step S215 is negative, the process proceeds to step S212, where the detection information up to that time is initialized, and the process returns to step S203.

If the result of the determination in step S215 is affirmative, the process proceeds to step S216, where the value of a counter for counting the number of operations of detecting on-times is incremented. Then, in step S217, maximum and minimum times are newly calculated by adding margins to the detected frequency and level and the detected on-time in order to set new detection parameters. Then, in step S218, the control unit 1 starts measurement of the off-time.

In step S211, the control unit 1 determines if a preset number of operations of detecting on-times and off-times has been achieved based on the values of the counters for detecting on-times and off-times. If the result of the determination in step S211 is negative, the process proceeds to step S212. If the result of the determination in step S211 is affirmative, information relating to the detected tone signal is held (when setting detection parameters, information corresponding to a tone to be detected is held as tone information), and the tone-signal detection processing is terminated.

The tone-signal detection processing is executed according to the flowchart shown in FIG. 6. In step S102 shown in FIG. 5, the control unit 1 determines if a DT (dial tone) has been detected in the executed tone-signal detection processing. If the result of the determination in step S102 is negative (i.e., when a DT has not been detected or a BT (busy tone) has been detected), the control unit 1 returns to waiting processing, and executes redialing processing or call-error processing.

If the result of the determination in step S102 is affirmative, then, in step S103, the control unit 1 transmits a dial signal to the communication network 101, and starts a timer for an initial-identification monitoring time period (for example, 35 seconds). Then, in step S104, the control unit 1 determines if the initial-identification monitoring time period has elapsed. If the result of the determination in step S104 is negative, then, in steps S105 and S106, a calling-station idetifying signal (CNG) is transmitted to the communication network 101 at a constant period (about 4 seconds). Then, in step S107, processing of detecting a tone signal (the processing shown in FIG. 6) is executed. In this tone-signal detection processing, a busy tone (BT)/a ringing end tone (ROT)/a ringing tone (RT) output from the switchboard is detected. In step S108, it is determined if a BT or a ROT is detected. In step S109, the control unit 1 sets the modem 106 to a mode of receiving a procedure signal of facsimile communication. In step S110, the control unit 1 determines if a control signal for a facsimile procedure (NSF/CSI/DIS signal) from the communication partner has been received based on an output from the modem 106.

In steps S107 and S109, a busy tone (BT)/a ringing end tone (ROT)/a ringing tone (RT) output from the switchboard, and a procedure signal for a facsimile transmission control procedure (NSF/CSI/DIS signal) transmitted from the facsimile apparatus of the communication partner are detected, respectively. When any other signal has been detected, it is assumed that a voice signal is detected because the communication partner is a person, or any other signal transmitted from the switchboard is detected, and the control unit 1 continues the monitoring processing.

If the result of the determination in step S108 is affirmative, the control unit 1 returns to waiting processing. If the result of the determination in step S110 is affirmative, the process proceeds to facsimile transmission. Thereafter, the processing of facsimile transmission is executed.

According to the above-described embodiment, a signal of a first period is detected based on a detection frequency, a level, an on-time and an off-time of a signal which have been set as initial settings with certain tolerance in consideration of variations in the characteristics of the communication partner's facsimile apparatus and the characteristics of a communication network. When a signal conforming to the initial setting has been detected, values obtained by adding some margins to the frequency, the level, and the on-time and off-time of the signal detected at the first period are set as new detection parameters, and a signal of the next period (second period) is detected using the new parameters. Hence, it is possible to improve reliability in signal detection, and to prevent erroneous detection due to a voice signal or any other control signal.

As described above, when detecting a signal from a communication network, it is possible to perform signal detection corresponding to variations in the characteristics of the communication apparatus of the communication partner and the characteristics of the communication network, and to improve reliability in signal detection.

Furthermore, since a signal is detected using a modem for data communication, exact signal detection can be performed without complicating the configuration of an apparatus.

The individual components designated by blocks in the drawings are all well-known in the communication apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus for detecting a desired signal from a communication line, said apparatus comprising:
   a detector adapted to detect a first portion of the desired signal from the communication line in accordance with preset detection parameters; and
   a parameter changer adapted to change the detection parameters based on the detected first portion of the desired signal, such that said detector detects a second portion of the desired signal in accordance with the changed detection parameters.

2. A communication apparatus according to claim 1, wherein the desired signal has at least one period and is detected by the detector based on a detection frequency, a level, an on-time, and an off-time of the desired signal.

3. A communication apparatus according to claim 2, wherein said parameter changer generates the changed detection parameters based on the frequency, the level, the on-time, and the off-time of the signal detected by said detector.

4. A communication apparatus according to claim 3, wherein said parameter changer generates the changed detection parameters by adding predetermined margins to the frequency, the level, the on-time, and the off-time of the signal detected by said detector.

5. A communication apparatus according to claim 1, further comprising a discrimination unit adapted to determine whether the desired signal has been detected when a predetermined number of periods of the desired signal have been detected.

6. A communication apparatus according to claim 1, wherein the preset detection parameters are parameters set in consideration of variations in characteristics of a communication apparatus of a communication partner and in consideration of variations in characteristics of the communication line.

7. A communication apparatus according to claim 1, further comprising a modem adapted to modulate and demodulate a signal for data communication, wherein said modem detects the desired signal.

8. A communication apparatus according to claim 1, further comprising a parameter setting unit adapted to set detection parameters corresponding to a signal to be detected as the preset detection parameters.

9. A communication method for detecting a desired signal from a communication line, said method comprising the steps of:

detecting a first portion of the desired signal in accordance with preset detection parameters; and changing the preset detection parameters based on the detected first portion of the desired signal to provide changed detection parameters, wherein said detecting step includes detecting a second portion of the desired signal in accordance with the changed detection parameters.

10. A method according to claim 9, wherein the desired signal has at least one period and is detected in said detection step based on a detection frequency, a level, an on-time, and an off-time of the desired signal.

11. A method according to claim 10, wherein said changing step generates the changed detection parameters based on the frequency, the level, the on-time, and the off-time of the detected signal.

12. A method according to claim 11, wherein said changing step generates the changed detection parameters by adding predetermined margins to the frequency, the level, the on-time, and the off-time of the detected signal.

13. A method according to claim 9, wherein it is determined in said detection step whether the desired signal has been detected when a predetermined number of periods of the desired signal have been detected.

14. A method according to claim 9, wherein the preset parameters are parameters set in consideration of variations in characteristics of a communication apparatus of a communication partner, and in consideration of variations in characteristics of the communication line.

15. A method according to claim 9, wherein the desired signal is detected in said detection step using a modem adapted to modulate and demodulate a signal for data communication.

16. A method according to claim 9, wherein detection parameters corresponding to a signal to be detected are set as the preset detection parameters.

17. A detection apparatus comprising:

a detector adapted to detect a first period of a desired signal from a communication line in accordance with a detection parameter; and a parameter changer adapted to update the detection parameter based on a detection result detected by said detector, wherein said detector detects a next period of the desired signal in accordance with the detection parameter updated by said parameter changer.

18. A detection method comprising:

a detection step of detecting a first period of a desired signal from a communication line in accordance with a detection parameter; and an update step of updating the detection parameter based on a detection result in said detection step, wherein said detection step includes detecting a next period of the desired signal in accordance with the detection parameter updated in said update step.

19. A communication apparatus comprising:

a detector adapted to detect a predetermined signal based on a preset detection parameter; and a parameter changer adapted to change the preset detection parameter based on a detection result from said detector, wherein said parameter changer changes at least one of a signal level, an on-time, and an off-time, and wherein said detector performs a next detection of the predetermined signal based on the changed detection parameter.

\* \* \* \* \*